Sept. 1, 1931. K. BOHÁČ 1,821,736
JOINT CONNECTION OF THE RODS IN STRUCTURES, GIRDERS, AND THE LIKE
Filed Dec. 17, 1927 2 Sheets-Sheet 1

INVENTOR
KAREL BOHÁČ
ATTORNEY

Inventor
Karel Boháč
per [signature]
Attorney

Patented Sept. 1, 1931

1,821,736

UNITED STATES PATENT OFFICE

KAREL BOHÁČ, OF PRAGUE, CZECHOSLOVAKIA

JOINT CONNECTION OF THE RODS IN STRUCTURES, GIRDERS, AND THE LIKE

Application filed December 17, 1927, Serial No. 240,901, and in Czechoslovakia January 7, 1927.

The invention relates to the construction of joints either plane or in three dimensions, which may form part of straight or curved structures such as girders or the like. They allow the transmission of the forces which act upon the rods meeting in them. The rods comprise braces and booms, the former being fixed to the latter. Both the booms and the braces may extend either from joint to joint or they may extend along several joints.

The connection is formed by the insertion of the booms into holes provided for that purpose in the braces. Unlike joints which are formed by riveting or screwing the ends of the rods which are placed face to face in the main plane of the girders, the plane of the surrounding ends of the rods is perpendicular to the plane of the main girders, and the axis of the braces is usually perpendicular to the axis of the booms. The braces are fixed to the booms and are connected together by wedges, locking members and the like let into the booms.

Figure 1:
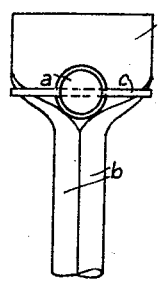
Figures 1 and 2 are respectively an end and a side view of one form of joint according to the invention.
Figure 2:
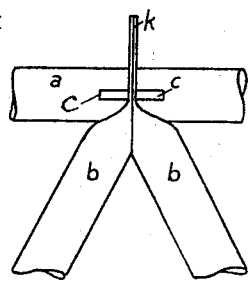
Figure 3:
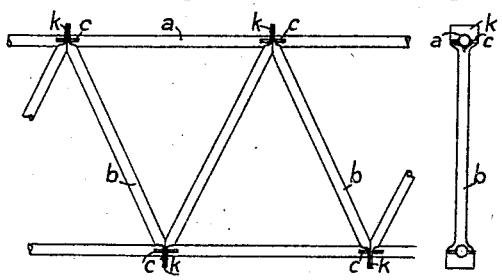
Figures 3 and 4 are respectively a side view and an end view of a portion of girder provided with joints similar to that shown in Figures 1 and 2.
Figure 4:
Figure 5:
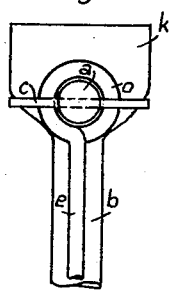
Figures 5 and 6 are respectively an end view and a side view of another form of joint according to the invention, Figures 7 and 8 being respectively a side view and an end view of a portion of girder having such joints.
Figure 6:
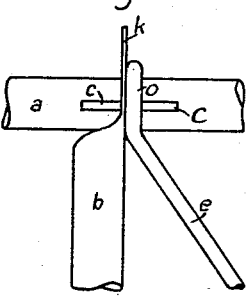
Figure 7:
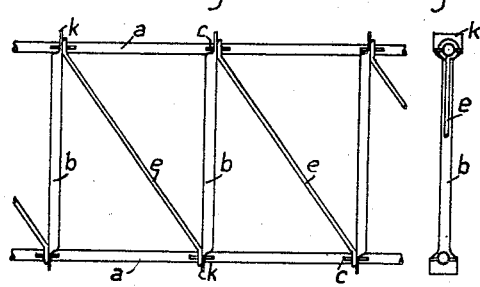
Figure 8:
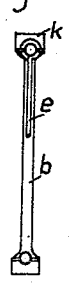
Figure 9:
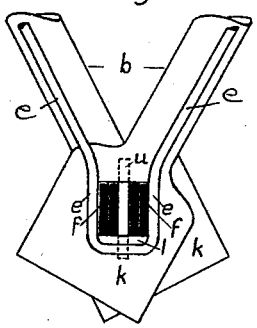
Figure 10:
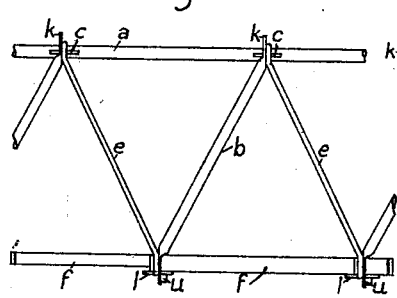
Figure 11:
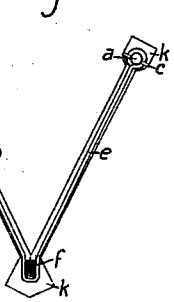
Figure 12:
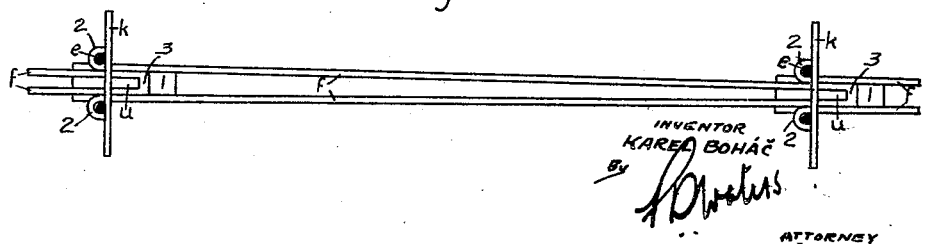
Figure 13:
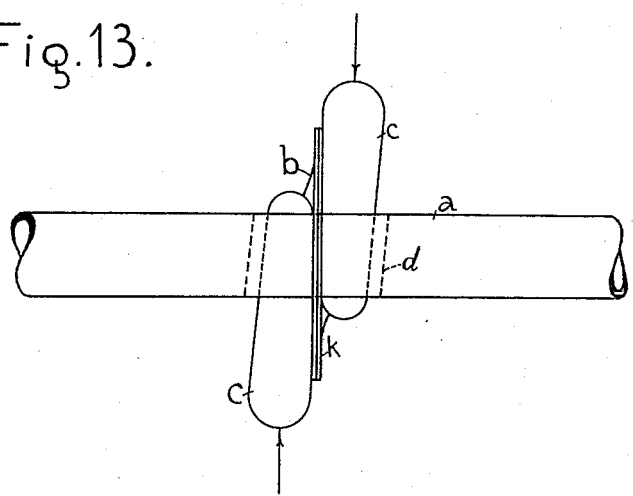
Figure 14:
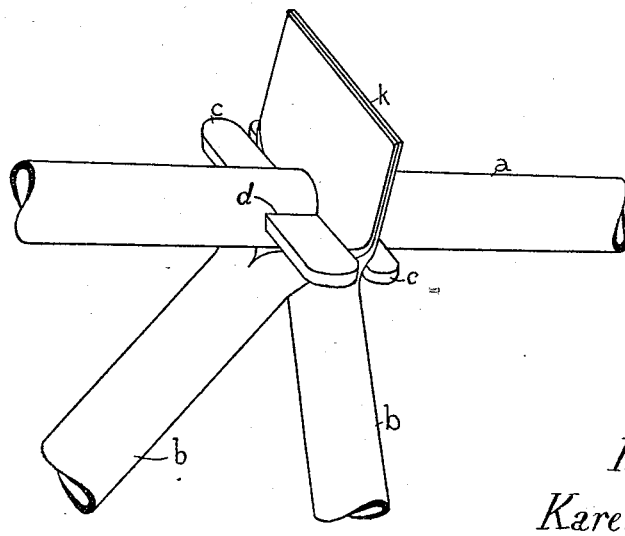

Figure 9 is an end view of a further form of joint, Figures 10 and 11 being respectively a side view and end view of a portion of triangulated girder provided with such joints, Figure 12 being a plan on the same scale as Figure 9 and on a larger scale than Figures 10 and 11, showing the joints for the lower boom. Figures 13 and 14 are respectively a plan view and a perspective view showing in a larger scale the first embodiment of the joint according to the present invention.

Referring to Figures 1 to 4, 13 and 14, the booms $a$ and the braces $b$ are in the form of tubes. When the braces $b$ are pressed from sheet metal, the ends $k$ are left or formed flat to constitute blades and are bent relatively to the tubular parts of the braces, so that their planes are at right angles to the boom $a$ after insertion, an opening corresponding to the profile of the boom being provided in each of said blades $k$.

Blades $k$ of the shape described may be formed on braces made of seamless tubes. The joints between the blades $k$ and the booms $a$ are tightened by means of wedges $c$ passed through slots $d$ (Figs. 13, 14) in the booms $a$, each joint comprising two of said wedges driven in one slot $d$ as shown in Figs. 13 and 14.

Figures 5 to 8 show an arrangement in which some of the braces $e$ are formed of solid iron bars of circular cross-section bent at the ends to form an eye $o$. The eye $o$ of each brace $e$ is firmly pressed against the adjacent blade $k$ of a brace $b$ and around the boom $a$ by the wedges $c$.

Figures 9 to 12 show the joints in a girder having a triangular cross section.

The upper part of the girder, in order to offer adequate resistance to compressive stresses is duplicated, while the lower part which resists the tensile stresses consists of a single boom $f$.

Tubular braces $b$ having blade-like ends $k$ are used together with other braces $e$ of round iron rod bent to a V shape. The ends of the braces $e$ have eyes $o$ for the upper booms $a$ while the lower boom $f$ rests in loops formed at the apex of the V shaped braces $e$ as well as in the pierced blades $k$.

The lower boom is illustrated in Fig. 12 as composed of aligned separate doubled bars with bent over ends 2. Each doubled link $f$ is first passed through a blade $k$ until its bent over ends 2 abut against the following blade $k$. The apex 3 of the next doubled member $f$ is next inserted between the turned over ends 2 and through the latter blade $k$, after which a wedge $u$, is inserted between said blade and said apex 3. A wedge 1 is inserted lengthwise between each loop of the V-shaped braces and the boom $f_7$ as well as through a blade $k_7$ to fix the braces in position on said boom and tighten them.

Each limb of a V-shaped brace *e* passes through a turned over end 2 of one link of the boom *f*.

The upper booms *a* may be reinforced by tubes or ferrules of greater diameter, the ends of which may abut against the blades *k*.

The advantage of the joints according to the invention is that it enables rods or tubes of circular cross-section to be used economically and avoids riveting, screwing and the like, which are unsuitable for rods and tubes of this kind.

The invention is not restricted to rods or tubes of circular cross section, for instance, although lapped or seamless tubes can be used, rolled bars of other cross sections or other suitable materials may be used. Joints can, in these cases, be produced in the most varied manner.

Structures having joints according to the invention may be employed for the erection of the skeleton framework of fixed and transportable houses (walls, ceilings, roofs) and also for the erection of the skeleton or framework of hangars as also for the reinforcing of concrete structures and the like.

The term eyes in the claims includes the pierced blades *k* as well as the eyes *o*.

I claim:

1. Joints for the assembly of the braces and booms of a girder or like structure each comprising eyes on the ends of the braces for the insertion of a boom, and two wedges driven through a slot in said boom on the opposite sides of said eyes for tightening said braces in position on the booms.

2. Joints for the assembly of the braces and booms of a girder or like structure each comprising eyes provided in blade-like ends of the braces for the insertion of a boom, the adjacent blade-like ends being adapted to be set at right angles to said boom, and two wedges driven through a cross-slot in said boom on the opposite sides of said blade-like ends to secure them in position on the boom and hence tighten said braces on said boom.

3. A girder or like structure comprising booms, braces connecting said booms together, said braces having pierced blade shaped ends for the insertion of said booms, and wedges driven in transversal slots in said booms on the opposite sides of the joined blade shaped ends for tightly securing them in position on said booms.

4. Joints for the braces and booms of girders and like structures, comprising in combination braces with flattened ends, each provided with a hole for the insertion of a boom, booms provided with transversal slots for the insertion of tightening wedges, and wedges driven by pairs in each of said slots on the opposite side of each assembly of brace's flattened ends for tightening said assembly.

5. Joints for the braces and booms of girders and like structures, comprising in combination braces with flattened ends, each provided with a hole for the insertion of a boom and bent so that they stand at right angles to the boom and to the plane of the girder, booms provided with transversal slots for the insertion of tightening wedges, and wedges driven by pairs in each of said slots on the opposite side of the adjacent flat ends of two joined braces, standing perpendicularly to the assembled boom for tightening each joint.

6. Joints for the braces and booms of girders and like structures, comprising in combination braces with flattened ends provided with holes for the passage of the booms and bent so that the flattened ends of contiguous braces abut one against the other in planes at right angles to the axis of the associated boom, booms provided with transverse slots for the insertion of tightening wedges, and wedges driven by pairs in each of said slots on the opposite sides of said abutting flat ends for tightening their joint.

7. Girder of triangular cross-section, comprising in combination a pair of upper booms, provided with transversal slots for the insertion of tightening wedges, a lower boom composed of separate doubled links assembled in line together and provided with bent over ends, braces belonging alternately to two different types, braces of one type consisting each of a single bar with both ends flattened and provided with a hole for the passage of the booms, braces of the other type being formed in couples, each couple consisting of a rod bent to a V-shape, the apex of which is formed as a loop adapted to surround the lower boom and to rest in the bent over ends of a link of said boom, tightening wedges driven into the slots of the upper booms on the opposite sides of each joint of braces for tightening said joint and wedges driven each between the apex of a link of the lower boom and the adjacent flattened end of a brace of the first type.

In testimony whereof I affix my signature.

KAREL BOHÁČ.